(12) United States Patent
Kociolek et al.

(10) Patent No.: US 11,654,401 B2
(45) Date of Patent: May 23, 2023

(54) GAS SEPARATION MEMBRANE CARTRIDGE WITH CLAMSHELL RETAINER

(71) Applicant: Generon IGS, Inc., Houston, TX (US)

(72) Inventors: Robert Kociolek, Benicia, CA (US); Marc Straub, Brentwood, CA (US); Frederick L. Coan, Antioch, CA (US); Luis Brizuela, Antioch, CA (US); John A. Jensvold, Benicia, CA (US); Kyle Jensvold, Walnut Creek, CA (US); Karen Skala, Benicia, CA (US)

(73) Assignee: Generon IGS, Inc., Houston, TX (US)

( * ) Notice: Subject to any disclaimer, the term of this patent is extended or adjusted under 35 U.S.C. 154(b) by 0 days.

(21) Appl. No.: 17/509,273

(22) Filed: Oct. 25, 2021

(65) Prior Publication Data

US 2023/0130439 A1    Apr. 27, 2023

(51) Int. Cl.
| | |
|---|---|
| *B01D 53/22* | (2006.01) |
| *B01D 69/08* | (2006.01) |
| *B01D 65/00* | (2006.01) |
| *B01D 71/06* | (2006.01) |
| *B01D 63/02* | (2006.01) |

(52) U.S. Cl.
CPC ............ *B01D 69/08* (2013.01); *B01D 53/22* (2013.01); *B01D 63/022* (2013.01); *B01D 65/003* (2013.01); *B01D 71/06* (2013.01); *B01D 2053/224* (2013.01)

(58) Field of Classification Search
CPC .... B01D 65/003; B01D 63/022; B01D 53/22; B01D 2053/224; B01D 71/06; B01D 69/08
See application file for complete search history.

(56) References Cited

U.S. PATENT DOCUMENTS

| | | | | |
|---|---|---|---|---|
| 4,881,953 A |   | 11/1989 | Prasad | |
| 4,929,259 A | * | 5/1990 | Caskey ................ | B01D 63/021 210/321.89 |
| 5,202,023 A | * | 4/1993 | Trimmer .............. | B01D 63/024 210/321.89 |
| 5,211,728 A |   | 5/1993 | Trimmer | |
| 6,153,097 A | * | 11/2000 | Jensvold .............. | B01D 63/043 210/321.89 |
| 6,165,361 A | * | 12/2000 | Heine .................. | B01D 63/043 210/232 |
| 6,224,763 B1 | * | 5/2001 | Feng ..................... | B01D 63/02 210/321.89 |

(Continued)

FOREIGN PATENT DOCUMENTS

WO    WO-9312866 A1 *  7/1993  ............. B01D 53/22

*Primary Examiner* — Anthony R Shumate
(74) *Attorney, Agent, or Firm* — William H. Eilberg

(57) ABSTRACT

A cartridge for non-cryogenically separating a gas into components includes a plurality of hollow polymeric fibers, the fibers being anchored by a pair of tubesheets, each tubesheet being adjacent to a head, the tubesheet and head being joined by a clamshell retainer. The cartridge does not have a core tube. The fibers are enclosed within a sleeve, the sleeve being sufficiently thin so as to be a non-structural element. The cartridge may be inserted within a larger pressure vessel. The cartridge of the present invention can accommodate more fibers than comparable cartridges of the prior art, and therefore has greater throughput.

4 Claims, 3 Drawing Sheets

(56) References Cited

U.S. PATENT DOCUMENTS

| | | | |
|---|---|---|---|
| 7,163,648 B2* | 1/2007 | Åsen | C01B 3/384 |
| | | | 252/376 |
| 7,497,894 B2 | 3/2009 | Jeffers | |
| 7,517,388 B2 | 4/2009 | Jensvold | |
| 7,578,871 B2 | 8/2009 | Jensvold | |
| 7,662,333 B2 | 2/2010 | Coan | |
| 7,938,386 B2* | 5/2011 | Koenig | F24F 6/00 |
| | | | 261/104 |
| 2007/0107596 A1 | 5/2007 | Wynn | |
| 2007/0157803 A1* | 7/2007 | McNeil | B01D 67/0095 |
| | | | 96/10 |
| 2015/0174533 A1* | 6/2015 | Li | B01D 63/022 |
| | | | 96/10 |
| 2016/0045858 A1 | 2/2016 | Schletz | |
| 2017/0001149 A1* | 1/2017 | Kulkarni | B01D 63/10 |
| 2017/0104865 A1 | 4/2017 | Skelton | |
| 2018/0161732 A1 | 6/2018 | Coignet | |
| 2019/0291056 A1* | 9/2019 | Osmundson | B01D 63/066 |
| 2021/0047832 A1 | 2/2021 | Giles | |
| 2022/0250008 A1* | 8/2022 | Chen | B01D 63/04 |

\* cited by examiner

GAS SEPARATION MEMBRANE CARTRIDGE WITH CLAMSHELL RETAINER

BACKGROUND OF THE INVENTION

The present invention relates to cartridges or modules for the non-cryogenic separation of gases into components.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets. The tubesheets are typically made of a resin material.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

One problem encountered with fiber membrane modules is their tendency to be damaged by elevated gas pressures. A feed stream having above ambient pressure, often as much as 500 psig, impinges on a tubesheet, and the pressure on the tubesheet can cause damaging stress on either a central core tube for the module, on an outer sleeve which encases the fibers, or on the fibers themselves. Such stress can lead to flexing of the module or cartridge, and of the tubesheet in particular, which can lead to membrane leaks and reduced durability in the field. Moreover, repeated pressurization and de-pressurization can distort the components of the module.

A solution to the above problem is proposed in U.S. Pat. No. 5,211,728, the disclosure of which is incorporated by reference herein. The latter patent describes a clamshell retainer, used to hold the components of the module together, such that the module resists the pressure of the incoming feed gas.

The problem with the clamshell structure shown in the above-cited patent is that the resulting module usually does not qualify as a legally certified pressure vessel, because the tubesheet, typically made of epoxy resin, to which an end cap is mechanically attached, is not a standard pressure vessel material. As such, the clamshell structure is not a rated or certified pressure vessel. Therefore, for regulatory reasons, the allowable size of the module is limited, and may not be larger than about six inches in diameter.

In the present invention, a module or cartridge, having a clamshell retainer, is inserted within a certified pressure vessel, such that the module can be constructed to maximize durability and efficiency, while the combined device still provides the desired pressure certification.

SUMMARY OF THE INVENTION

The present invention comprises a gas separation cartridge or module which is inserted within, and removable from, a pressure vessel.

The cartridge includes a plurality of hollow polymeric fibers, formed of a material for separating gas into components. The fibers are anchored by tubesheets, disposed near either end of the cartridge. Each tubesheet is adjacent to a head, and each combination of a tubesheet and a head is held together by a clamshell retainer.

The cartridge does not have a core tube within the region containing the fibers, because the clamshell structure enables the heads and tubesheets to act as a unit, and to resist pressure from external gas flows. Thus, the structural benefit of a core tube is not required. Eliminating the core tube provides additional volume within which more fibers can be provided.

Also, the fibers are held within a sleeve, but the sleeve may be made thin and non-structural. That is, the sleeve may be sufficiently thin that it does not resist external gas pressure. Instead, the gas pressure is countered by the head and tubesheet combinations, as they are joined by the clamshell retainers. Reducing the thickness of the sleeve also allows more fibers to be provided in the cartridge.

The cartridge is inserted within, and removable from, a pressure vessel which includes a case and an end cap.

A permeate seal is disposed between the case and the end cap, and is displaced from, and independent of, the tubesheet. Thus, the sealing of the permeate gas is accomplished at a location where there is metal-to-metal contact, instead of sealing between a metal case and a resin tubesheet. This arrangement provides a more durable and reliable sealing structure.

The present invention therefore has the primary object of providing an apparatus for non-cryogenic separation of gases.

The invention has the further object of providing a gas separation cartridge having improved throughput, while relying on an external pressure vessel for sealing the cartridge from the outside environment.

The invention has the further object of providing a gas separation membrane module in which the amount of polymeric fiber packed into the module is maximized.

The invention has the further object of providing a gas separation cartridge of improved durability and throughput.

The reader skilled in the art will recognize other objects and advantages of the present invention, from a reading of the following brief description of the drawings, the detailed description of the invention, and the appended claims.

DETAILED DESCRIPTION OF THE INVENTION

The present invention comprises a cartridge or module containing a plurality of hollow polymeric fibers for non-cryogenic separation of air or other gases. The cartridge is intended to be inserted into, and held within, an external pressure vessel.

As will be explained in detail below, the structure of the cartridge of the present invention inherently resists the pressure exerted by the feed gas. For this reason, the cartridge of the present invention can omit various elements that have been used in the prior art, such as a core tube and/or a thick sleeve surrounding the fibers, which elements oppose the force of the feed gas.

Figure 1:
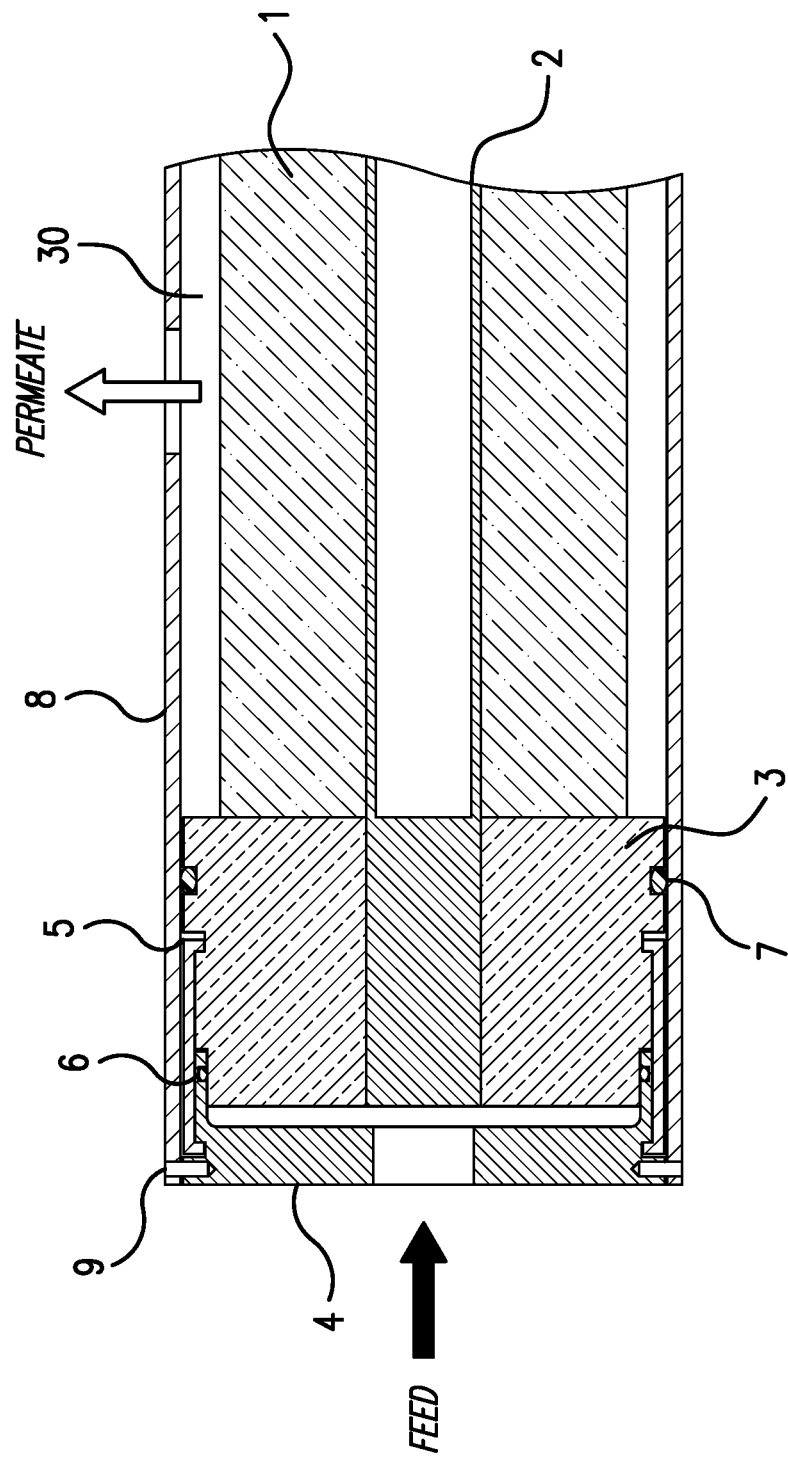
FIG. 1 provides a cross-sectional view of a gas separation module or cartridge of the prior art.

FIG. 1 provides a cross-sectional view of a gas separation module of the prior art. The module is defined by case 8 within which there are disposed a plurality of tiny, hollow, polymeric fibers. The fibers are not shown explicitly, but are represented schematically by reference numeral 1. The fibers are arranged around core tube 2.

A resin tubesheet 3 holds the ends of the fibers. The figure is broken away, and shows only the tubesheet on the left-hand side, but it should be understood that there is a similar tubesheet on the right-hand side. Thus, the fibers are anchored by a pair of tubesheets, the tubesheets being located at either end of the fibers. Each tubesheet bears permeate seal 7, which extends around the periphery of the tubesheet, and which seals between the permeate gas, which appears in space 30, and ambient pressure. Seal 6 provides separation between the feed gas and the permeate gas.

A head 4 defines an opening for the feed gas. A clamshell retainer 5 engages grooves in the tubesheet and the head, and therefore holds these components together. Pin 9 engages the head and holds it within the case 8.

The prior art device of FIG. 1 has the disadvantage that some of the internal space within the module is occupied by a core tube, which reduces the amount of fiber that could otherwise be packed inside. Also, the fiber bundle may be enclosed within a relatively thick sleeve. The sleeve, which has structural stiffness, opposes the force of incoming feed gas. But the space occupied by the sleeve is space that could have been used instead to provide more fibers.

Figure 2:
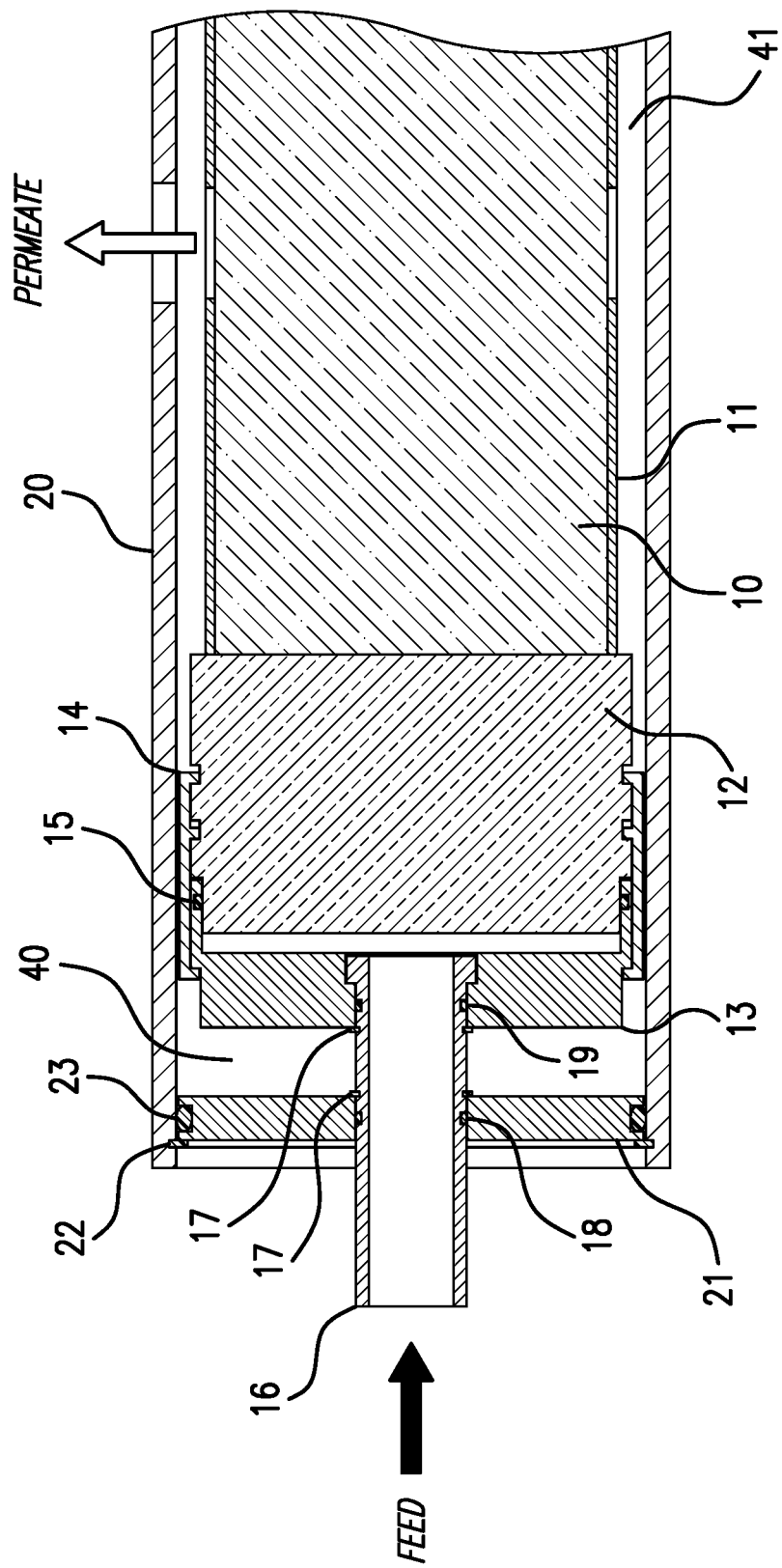
FIG. 2 provides a cross-sectional view of a gas separation module or cartridge of the present invention, the cartridge being shown installed within an outer pressure vessel.

FIG. 2 provides a cross-sectional view of the cartridge and pressure vessel of the present invention. The pressure vessel includes case 20 and end cap 21. The end cap is sealed by seal 23.

The cartridge includes a fiber bundle 10 which is held within sleeve 11, a pair of resin tubesheets 12, a pair of heads 13, and clamshell retainers 14. Head extension 16 defines a channel for entry of feed gas. Retaining ring 17 anchors the head extension. The clamshell retainer 14 engages grooves formed in the tubesheet and the head, and thus holds the tubesheet securely to the head.

As in the case of FIG. 1, FIG. 2 is broken away so as not to illustrate the components on the right-hand side. But it should be understood that there is a similar tubesheet, head, and clamshell retainer, as well as the corresponding seals, on the right-hand side. For this reason, components such as the tubesheets, heads, and clamshell retainers are identified in the plural.

Seal 15 isolates the feed gas from the permeate gas, which fills the spaces labeled 40 and 41. Seals 18 and 22 isolate the permeate gas from ambient pressure. Seal 19 isolates the feed gas from the permeate gas.

In the present invention, as shown in FIG. 2, pressure from the feed gas is exerted on the tubesheet and head. But because the tubesheet and head are securely joined by the clamshell retainer, they resist the pressure, and such pressure is not transmitted to the fibers. As a result, there is no need to provide a core tube, and there is no need to provide a thick, structural sleeve surrounding the fiber bundle. By contrast, the prior art uses a core tube, and/or a relatively thick sleeve, having structural capability, to resist the gas pressure.

By eliminating the core tube, and by allowing the sleeve to be thin and non-structural, more space becomes available for fibers. In practice, the present invention may increase the number of fibers which may be packed into the cartridge, by up to about 15%, as compared with prior art modules of similar size. This increase in the number of fibers causes a corresponding increase in product flow compared to a prior art cartridge. Thus, the cartridge made according to the present invention is more efficient, because it has more fiber in the same total volume.

The exact thickness of the sleeve can vary according to the particular application. But in general, the sleeve is preferably made sufficiently thin so that the sleeve is a non-structural element. That is, for the reasons given above, the sleeve is not needed for resisting the pressure of an external gas. So the sleeve may be made of a thin, flexible, non-rigid material, which serves no structural purpose other than to provide a convenient container for the bundle of fibers.

In FIG. 2, the cartridge comprises the fiber bundle, the sleeve, the tubesheets, the heads, and the clamshell retainers holding the head and tubesheet together. The cartridge can then be inserted within a pressure vessel, which is includes case 20 and end cap 21 in FIG. 2. The cartridge could be removed, and the pressure vessel used for another purpose. The outer pressure vessel is independent of the cartridge inserted within it.

The arrangement of FIG. 2 is advantageous for reasons of regulatory compliance. The pressure vessel is preferably one which has been certified to withstand certain pressures. In practice, it is difficult to obtain a pressure vessel rating for a clamshell structure, because the epoxy resin used to form the tubesheet is not a standard pressure vessel material. The present invention makes such rating unnecessary. By inserting the cartridge within the pressure vessel, one obtains the advantages of the clamshell retainer, resulting in a gas separation cartridge having improved throughput, while also providing a module with a casing having the desired certification for operation at high pressure. The clamshell structure makes the cartridge more durable and efficient, while the external casing satisfies the requirement for having a rated pressure vessel.

Moreover, the present invention allows the cartridge to be removed from the pressure vessel, and the pressure vessel can be used again for another purpose.

Another feature of the present invention resides in the placement of seals. It has been found that when the permeate seal is integral to the resin tube sheet, as is shown in FIG. 1 (illustrating seal 7 for tubesheet 3), the seal is imperfect, because the contact between the resin tubesheet and the metal case is not dimensionally stable. The resin tubesheet may buckle or flex relative to the metal case, causing membrane leaks and reduced durability of the module.

In the present invention, as shown in FIG. 2, the permeate seal is independent of, and physically removed from, the resin tubesheet. Thus, in FIG. 2, seal 22 is displaced away from, and independent of, the tubesheet 12. This seal is positioned in a groove in a metal component, which abuts another metal component, instead of in a component made of resin. Locating the seal between machined metal parts allows for better control of the fit between the metal components. Metal-to-metal contact is considered more reliable than contact between metal and resin.

Figure 3A:
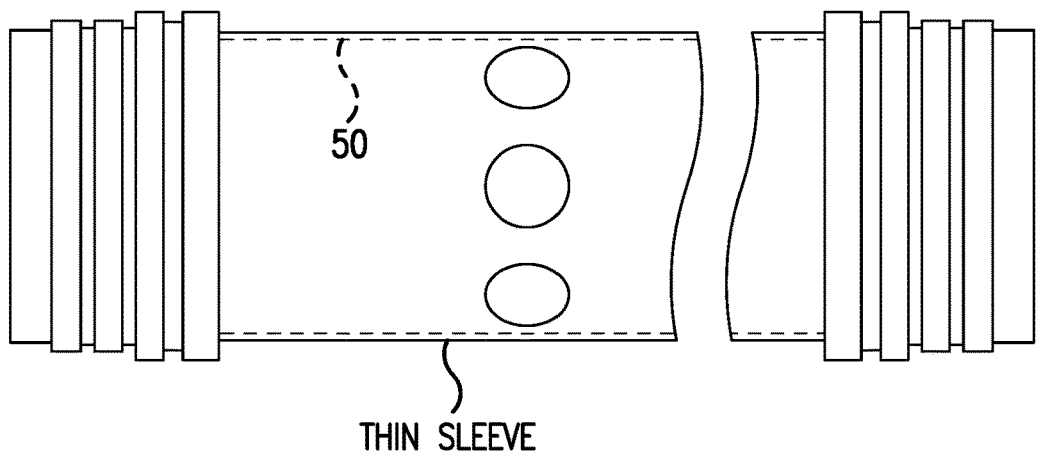
FIGS. 3a-3c provide simplified schematic views of the cartridge of the present invention, and of two prior art versions of similar cartridges.
Figure 3B:
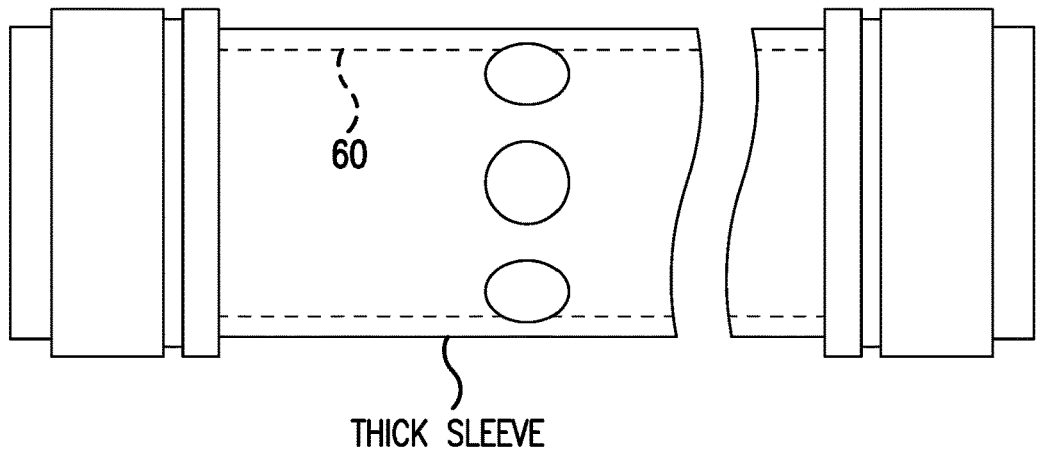
Figure 3C:
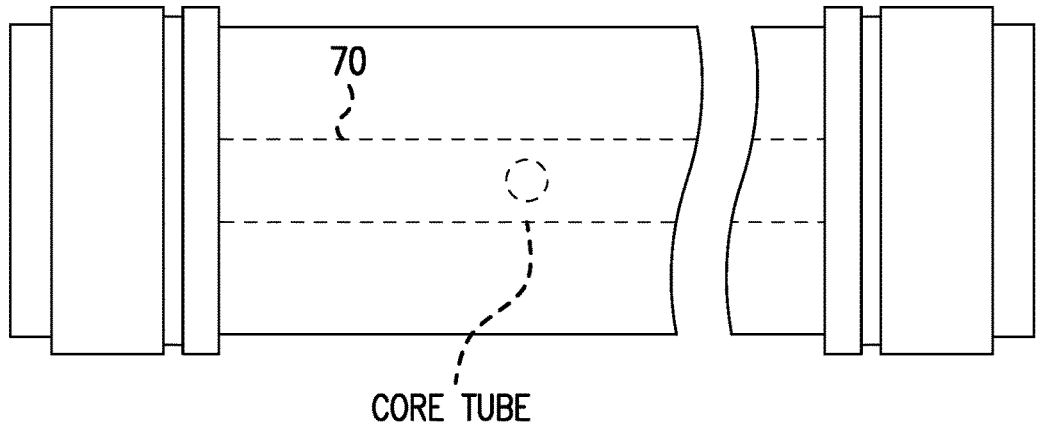

FIGS. 3a-3c schematically illustrate the major features of the present invention, in comparison with the prior art. These figures schematically indicate the cartridge of the present invention (FIG. 3a), and the modules of the prior art (FIGS. 3b and 3c).

FIG. 3a shows a thin sleeve 50, and no core tube. There is no significant compressive force on the fiber, due to the operation of the clamshell retainer (not shown in FIG. 3a), so the sleeve may be made thin and non-structural, and no core tube is required.

By contrast, FIG. 3b represents a prior art structure in which the sleeve 60 is thick. Thus, the compressive force, exerted on the fiber bundle by the feed gas, is resisted by the thick sleeve.

FIG. 3c represents a prior art structure in which there is a core tube 70. In this case, the compressive force exerted by the feed gas, on the fiber bundle, is resisted by the core tube.

The advantages of the present invention can therefore be quickly appreciated by comparing FIG. 3a with FIGS. 3b and 3c.

The invention can be modified in various ways, as will be apparent to those skilled in the art. Such modifications should be considered within the spirit and scope of the following claims.

What is claimed is:

1. Apparatus for non-cryogenically separating a gas into components, comprising:
   a) a gas separation cartridge, the cartridge including a plurality of hollow polymeric fibers, the fibers being anchored by a tubesheet, the tubesheet being adjacent to a head, the tubesheet and head being joined by a clamshell retainer, wherein the cartridge is free of any core tube,
   b) a pressure vessel including a case and an end cap, wherein the cartridge is inserted within the pressure vessel,
   wherein the fibers are enclosed within a sleeve, and wherein the sleeve is sufficiently thin so as to be a non-structural element within the cartridge.

2. The apparatus of claim 1, further comprising a permeate seal which seals the end cap to the case, and wherein the seal is displaced from, and independent of, the tubesheet.

3. The apparatus of claim 1, further comprising a permeate seal which seals the end cap to the case, and wherein the seal is displaced from, and independent of, the tubesheet.

4. Apparatus for non-cryogenically separating a gas into components, comprising:
   a) a gas separation cartridge, the cartridge including a plurality of hollow polymeric fibers, the fibers being anchored by a tubesheet, the tubesheet being adjacent to a head, the tubesheet and head being joined by a clamshell retainer, wherein the cartridge is free of any core tube,
   b) a pressure vessel including a case and an end cap, wherein the cartridge is inserted within the pressure vessel,
   further comprising a permeate seal which seals the end cap to the case, and wherein the seal is displaced from, and independent of, the tubesheet.

* * * * *